(12) United States Patent
Forster et al.

(10) Patent No.: US 7,388,678 B2
(45) Date of Patent: Jun. 17, 2008

(54) METHOD AND DEVICE FOR THREE-DIMENSIONALLY DETECTING OBJECTS AND THE USE OF THIS DEVICE AND METHOD

(75) Inventors: Frank Forster, München (DE); Christian Hoffmann, München (DE); Peter Rummel, Gmund (DE)

(73) Assignee: Siemens Aktiengesellschaft, Munich (DE)

( * ) Notice: Subject to any disclaimer, the term of this patent is extended or adjusted under 35 U.S.C. 154(b) by 211 days.

(21) Appl. No.: 10/521,605

(22) PCT Filed: Jul. 17, 2003

(86) PCT No.: PCT/DE03/02410

§ 371 (c)(1),
(2), (4) Date: Sep. 23, 2005

(87) PCT Pub. No.: WO2004/010076

PCT Pub. Date: Jan. 29, 2004

(65) Prior Publication Data

US 2006/0098212 A1    May 11, 2006

(30) Foreign Application Priority Data

Jul. 18, 2002   (DE) ............................ 102 32 690

(51) Int. Cl.
*G01B 11/24* (2006.01)
(52) U.S. Cl. .................. 356/603; 356/604; 356/610
(58) Field of Classification Search ......... 356/601–623
See application file for complete search history.

(56) References Cited

U.S. PATENT DOCUMENTS

| | | | |
|---|---|---|---|
| 5,912,644 A | * | 6/1999 | Wang .......................... 342/457 |
| 6,341,016 B1 | | 1/2002 | Malione |
| 7,092,014 B1 | * | 8/2006 | Li et al. ................... 348/218.1 |
| 7,230,694 B2 | * | 6/2007 | Forster et al. ......... 356/139.03 |
| 2003/0002052 A1 | * | 1/2003 | Hoffmann .................... 356/603 |
| 2005/0068544 A1 | * | 3/2005 | Doemens et al. ........... 356/601 |

FOREIGN PATENT DOCUMENTS

| | | |
|---|---|---|
| DE | 196 38 727 A1 | 3/1998 |
| DE | 199 63 333 A1 | 7/2001 |
| EP | 0 328 443 A1 | 8/1989 |

OTHER PUBLICATIONS

Forster et al , "Real-Time Range Imaging for Dynamic Scenes Using Colour-Edge Based Structured Light", vol. 3, pp. 645-648.*
Vuylsteke et al., "Range Image Acquisition with a Single Binary-Encoded Light Pattern", IEEE Transactions on Pattern Analysis and Machine Intelligence, vol. 12, No. 2, Feb. 1990, pp. 148-164.
Salvi et al., "A robust-coded pattern projection for dynamic 3D scene measurement", Pattern Recognition Letters 19, 1998, pp. 1055-1065.

(Continued)

*Primary Examiner*—Hoa Q Pham
(74) *Attorney, Agent, or Firm*—Young & Thompson

(57) ABSTRACT

In order to determine three-dimensional coordinates of a surface (2) of an object (3) to be detected, the changes in color of a color pattern (5), which is projected by a projector (4) onto the surface (2), are to be encoded by using a redundant code. An analyzing method, which analyzes the changes in color occurring in an image (7) recorded by a camera (6), is insensitive to changes on the surface (2). In addition, the contour of the object (3) can be determined with a single recording. The method is thereby also suited for moving objects.

19 Claims, 3 Drawing Sheets

OTHER PUBLICATIONS

Caspi et al., "Range Imaging with Adaptive Color Structured Light", IEEE Transactions on Pattern Analysis and Machine Intelligence, vol. 20, No. 5, May 1998, pp. 470-480.

Griffin et al., "Generation of Uniquely Encoded Light Patterns for Range Data Acquisition", Pattern Recognition, vol. 25, No. 6, 1992, pp. 609-616.

Boyer et al., "Color-Encoded Structured Light for Rapid Active Ranging", IEEE Transactions on Pattern Analysis and Machine Intelligence, vol. PAMI-9, No. 1, Jan. 1987, pp. 14-28.

Friedrich M. Wahl, "A Coded Light Approach for Depth Map Acquisition", IBM Zurich Research Laboratory, pp. 12-17.

Stahs et al., "Surface Measurement performed by a 3D Robot Sensor", Zeitschrift fur Photogrammetrie und Fernerkundung, Jun. 1990, pp. 190-202.

Stahs et al., "Fast and Robust Range Data Acquisition in a Low-Cost Environment", Institute for Robotics and Computer Control Technical University of Braunschweig, FRG, SPIE vol. 1395 Close-Range Photogrammetry Meets Machine Vision, 1990, pp. 496-503.

Hugli et al., "Generation and Use of Color Pseudo Random Sequences for Coding Structured Light in Active Ranging", SPIE vol. 1010 Industrial Inspection, 1988, pp. 75-82.

Maruyama et al., "Range Sensing by Projecting Multiple Slits with Random Cuts", IEEE Transactions on Pattern Analysis and Machine Intelligence, vol. 15, No. 6, Jun. 1993, pp. 647-651.

Proesmans et al., "One-Shot Active 3D Shape Acquisition", ESAT-MI2-VISICS, Katholieke Universiteit of Leuven, 1996, pp. 336-340.

Proesmans et al., "Active Acquisition of 3D Shape for Moving Objects", ESAT-MI2, Katholieke Universiteit of Leuven, 1996, pp. 647-650.

* cited by examiner

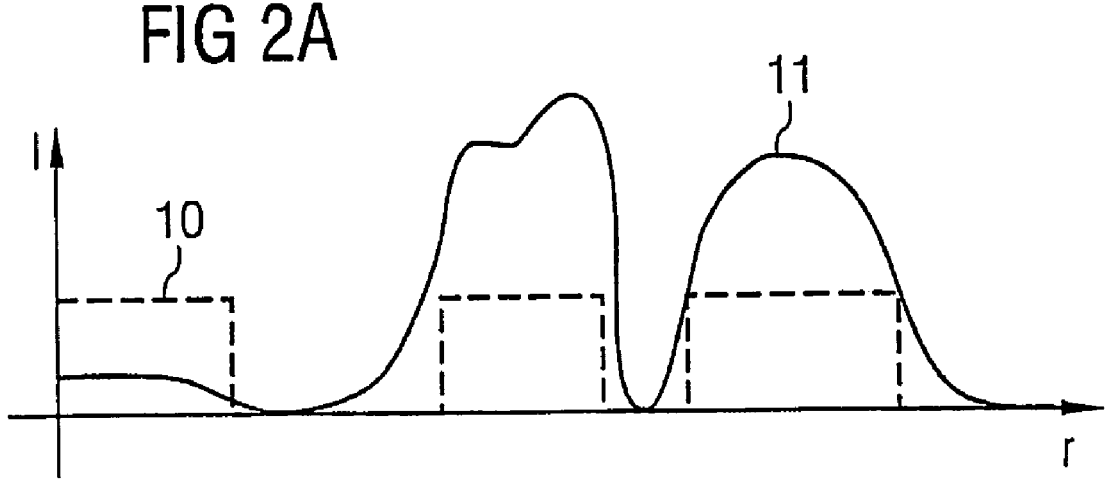
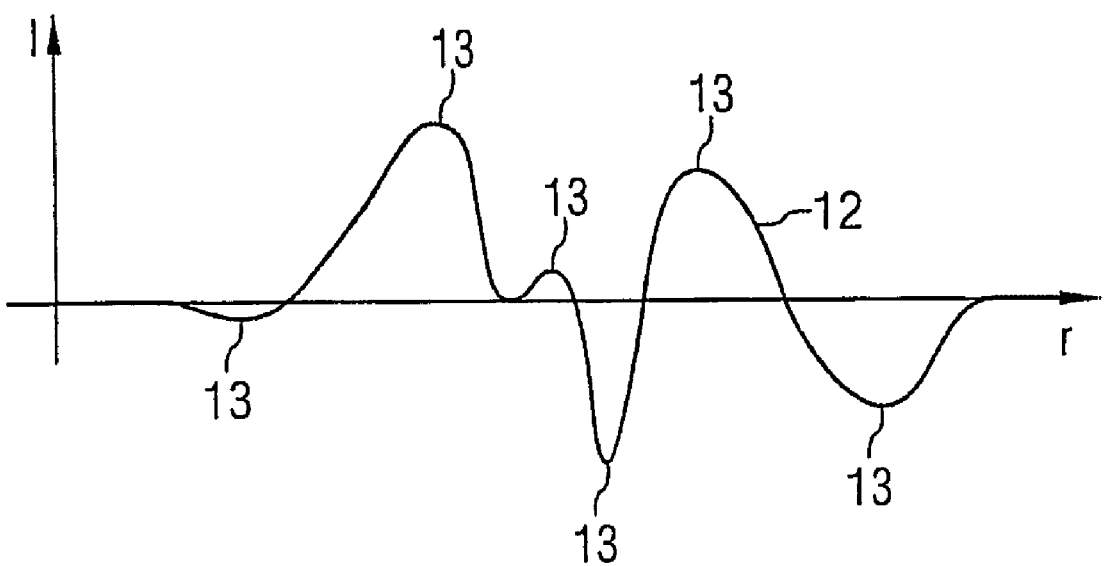
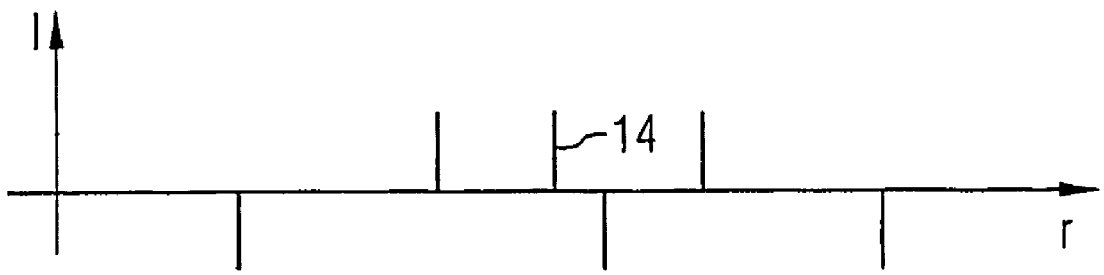

METHOD AND DEVICE FOR THREE-DIMENSIONALLY DETECTING OBJECTS AND THE USE OF THIS DEVICE AND METHOD

CROSS REFERENCE TO RELATED APPLICATION

This is the 35 USC 371 national stage of international application PCT/DEO03/02410 filed on 17 Jul. 2003, which designated the United States of America.

FIELD OF THE INVENTION

The invention relates to a method for three-dimensionally detecting objects, in which
a color pattern with known projection data is projected onto the object to be detected,
the pattern projected onto the object to be detected is recorded with the aid of a camera and
the image created by the camera is processed in an analysis unit into three-dimensional object coordinates.

The invention further relates to a device for executing the method and to use of the device and the method.

BACKGROUND OF THE INVENTION

Methods for three-dimensional detection of objects are needed for different purposes, including the identification and authentication of persons. Thus for example projecting a two-dimensional color pattern made of colored pattern elements and using a camera to record the color pattern projected onto the object to be detected is known from DE 199 63 333 A1. As a result of the spatial properties of the surface of the object to be detected the color patterns in the image recorded by the camera are shifted in relation to the original arrangement, so that for a known position of the projector and the camera, the three-dimensional data of an object point on the surface of the object to be detected can be calculated.

The known method is however not suitable for colored scenes. Instead, with the known method, it is necessary to record a reference image with evenly white object illumination. This reference image allows the projected colors in the sample image to be determined. Since with the known method at least two images need to be recorded, it is limited as to its suitability for moving objects or objects which change their shape. Thus this known method has only restricted suitability for detecting a hand or a face.

Projection of a black and white two-dimensional pattern with additional encoding into the object to be detected is known from the publication by P. Vuylsteke and A. Oosterlinck, "Range Image Acquisition with a Single Binary-Encoded Light Pattern", IEEE Transactions on Pattern Analysis and Machine Intelligence, Volume 12, No. 2, February 1990. This attempts to determine the angle of projection for each point of the camera image from the image environment of the point. In particular it attempts to calculate the angle of projection of the relevant point from the distortions of the projected pattern arising from the spatial orientation of the object surface as viewed by the camera. However this only succeeds well for objects with a constantly moving surface. If however indentations are present on the object to be detected, the coding pattern elements of the pixel environment are disturbed, which results in non-determinable or incorrect projector angles and leads as a result to incorrect three-dimensional object coordinates.

SUMMARY OF THE INVENTION

Using this prior art as its point of departure, the object of the invention is thus to specify a method for three-dimensional detection of objects which is not adversely affected either by the coloration or by indentations in the object to be detected.

A further object of the invention is to specify a device for executing the method.

These objects are achieved by a method and a device with the features of the independent claims. Advantageous embodiments and developments of the invention are specified in dependent claims of said claims.

With the method in accordance with the invention the projection coordinates are encoded in the color pattern with the aid of a redundant code. The use of a color pattern for encoding offers the advantage of enabling encoding to be executed in a compact way such that damage to the code by indentations or covered areas, especially in facial recognition, is unlikely. Above and beyond this the encoding is robust as regards errors since color discrepancies in the image generated by the coloring of the object can be detected and eliminated in the image.

A device set up to execute the method thus features a projector which projects a redundantly coded color pattern onto the object to be detected.

In a preferred embodiment of the method the color values of the color pattern are subdivided into codewords. The codewords in this case preferably exhibit a non-trivial Hamming distance. A non-trivial Hamming distance should in this case be taken to be a Hamming distance greater than 1. With this form of encoding good results in the detection of the encoded projection data have been achieved.

The robustness of the encoding can be further increased by having the codewords overlap.

Further measures relate to the color changes in the individual channels. The detection accuracy can for example be increased by the color values in each color channel being able to assume only two color values defined in advance. Expediently the color change ranges in each color channel between a minimum possible value and a further maximum possible value.

A further requirement can be imposed for color changes to have to occur simultaneously in at least two color channels.

Errors attributable to changes in the coloring of the object to be detected can be eliminated by these two methods.

A further useful requirement for the color pattern relates to the number of color changes in each codeword. If at least one color change takes place in each codeword in each of the color channels, detection errors cannot be propagated over a number of codewords.

The detection accuracy can be further improved by encoding the color changes into codewords of a redundantly encoded code. These requirements for the encoding of the color pattern allow errors in decoding to be reliably detected.

Decoding is undertaken here by the analysis unit detecting the turning points of the detected measurement signal by determining the maxima of the first derivation. The turning points detected in this way, which can be assigned to potential color changes, are subsequently checked for the criteria which fulfill the encoding of the color code. This includes checking the size of the color change and the correlation of the color changes between the channels. A further criterion is for example that the turning points with positive and negative rise must each occur in pairs and that the color changes must correspond to the codewords of the color changes.

Finally the color changes are checked for matches with the encoded codewords of the color change and the projection data assigned to a point of the recorded image. From the projection data and the coordinates of the relevant point in the image recorded by the camera the three-dimensional object coordinates of the surface of the object to be detected can then be calculated.

BRIEF DESCRIPTION OF THE DRAWINGS

The invention is explained in detail below with reference to the enclosed drawing. The diagrams show:

FIG. 2a to c Diagrams which illustrate the data reduction; and

DETAILED DESCRIPTION OF THE INVENTION

Figure 1:
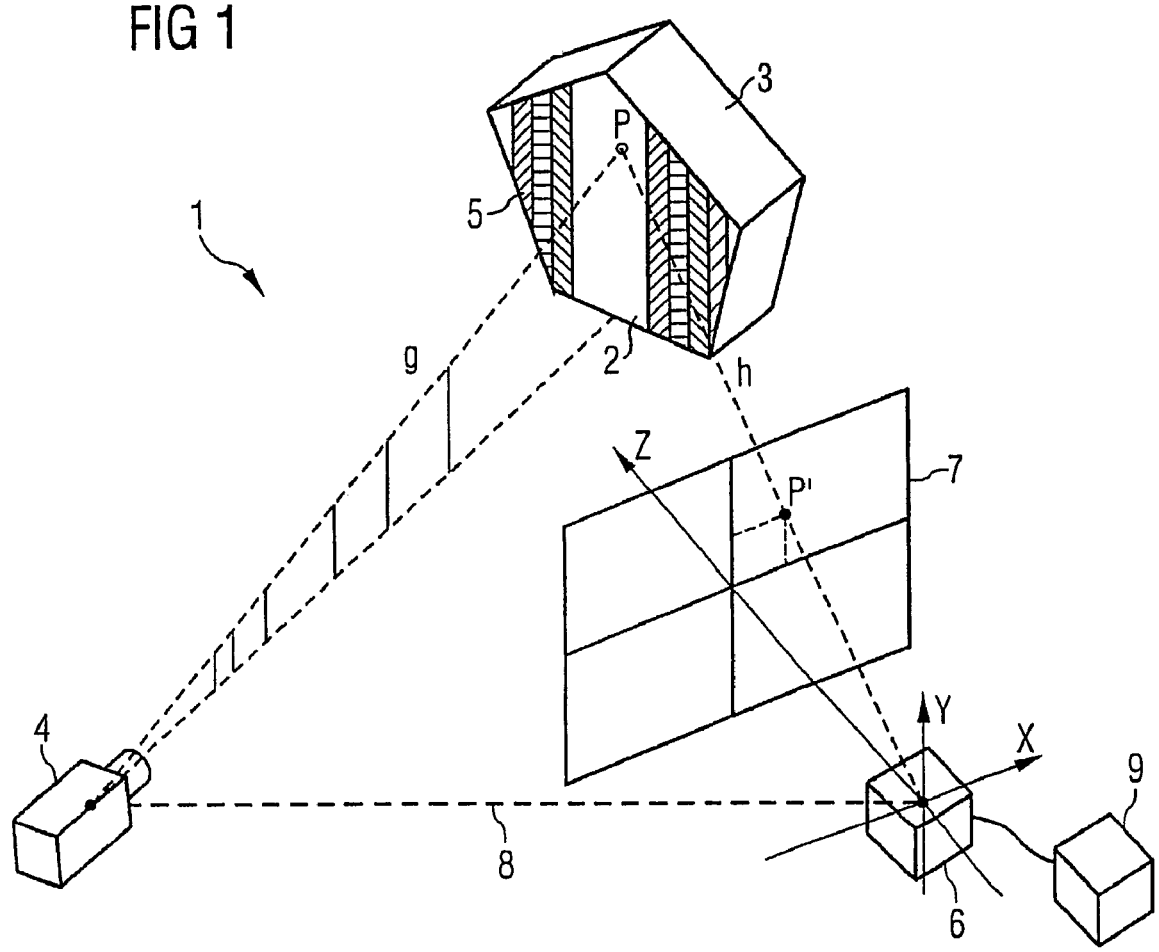
FIG. 1 A view of a device for the three-dimensional recording of object data.

FIG. 1 shows a device 1 which is used to determine the three-dimensional object coordinates of a surface 2 of an object 3 to be recorded.

Device 1 features a projector 4 which projects a color pattern 5 onto the surface 2 of the object to be recorded 3. In the case shown in FIG. 1 the color pattern 5 is composed of a series of adjacent colored stripes. It is however also conceivable to use a two-dimensional color pattern instead of the one-dimensional color pattern 5 shown in FIG. 1.

With the exemplary embodiment shown in FIG. 1 each point P of the surface 2 of the object 3 can be assigned a projection level g. Projection data is encoded by the color pattern 5 in this way. The color pattern 5 projected onto the surface 2 of the object 3 is converted by a camera 6 into an image 7 in which the point P on the surface 2 is transformed into the point P'. For a known arrangement of the projector 4 and the camera 6, especially with a known length of the basic distance 8, triangulation can be used to calculate the three-dimensional space coordinates P on the surface 2. The data reduction and analysis required for this is performed by an analysis unit 9.

To enable the three-dimensional space coordinates of the point P to be determined on the surface 2 from an individual image 7 even if the surface 2 of the object 3 has indentations and covered areas, the color pattern 5 is constructed in such as way that the encoding of the projection levels g is as robust as possible in relation to errors. The coding further allows errors which relate to the coloring of the object to be eliminated.

For the exemplary embodiment shown in FIG. 1 the colors of the color pattern 5 are described by the RGB model. The color values of the color pattern 5 are changed by changes to the color values in the individual color channels R, G and B.

The color pattern should satisfy the following conditions:
Only two color values will be used in each color channel. In particular the minimum value and the maximum value respectively will be used in each color channel, so that in the RGB model overall a total of eight colors are available.

Within a codeword each color channel features at least one color change. This condition makes it possible to decode the individual codewords.

Adjacent color elements differ in at least two color channels. This condition is used especially to guarantee error tolerance, especially in relation to indentations.

The individual codewords of the color pattern 5 features a non-trivial Hamming distance. This condition too serves to increase the error tolerance on decoding of the projection levels g.

The color changes are also compiled into codewords with a non-trivial Hamming distance.

An example is given below for color pattern 5 which satisfies the five conditions stated above. This color pattern 5 relates to the RGB model with a red color channel R, a green color channel G and a blue color channel B. Since color values in each color channel can only assume the minimum value and maximum value respectively, a total of eight mix colors are available to which the following numbers will be assigned:

| | |
|---|---|
| Black | 0 |
| Blue | 1 |
| Green | 2 |
| Cyan | 3 |
| Red | 4 |
| Magenta | 5 |
| Yellow | 6 |
| White | 7 |

A length of four color stripes has been selected for the codewords of the color values, with adjacent codewords overlapping with three color strips.

Numerical values have also been assigned to color changes. Since in each of the three color channels the color value can remain the same, can fall or can rise, a total of 27 different color changes of the mix colors is produced, each of which has been assigned a number between 0 and 26. The length of the codewords assigned to the color changes has been selected as equal to three color changes, with adjacent codewords overlapping with two color changes.

A search algorithm was used to find the following number series which describes an exemplary embodiment of the color pattern 5 which satisfies the above-mentioned five conditions:

12430705612174142703421272165341716143616053063527170724163052507471470650356036347 43506172524253607

In the specified exemplary embodiment the first codeword consists of the digits 1243, the second codeword of the digits 2340 and the third codeword of the digits 4307. The exemplary embodiment shown represents a very robust encoding.

FIGS. 2a to c illustrate the data reduction. FIG. 2a shows an original color signal 10. The original color signal 10 is shaped by the surface 2 of the object 3 into a measurement signal 11. To clarify matters it should be pointed out that the color signal 10 and the measurement signal 11 are shown running at an angle to the colored stripes of the color pattern 5 shown in FIG. 1.

For data reduction a first derivation 12 of the measurement signal 11 is calculated in a first step. Subsequently the turning points of the measurement signal 11 are determined by calculating the extreme values 13 of the first derivation 12. The exact position is calculated by directly fitting a parabola or a cubic polynomial to the environment of an extreme value of derivation 12. The extreme values produced in this way are combined in accordance with their spatial distribution to form extreme values of the mixed color signal which extend over a number of color channels. The position of the extreme values extending over a number of color channels is calculated by forming a weighted average of the position of the extreme values in the individual color channels. The factors used for weighting are formed on the basis of the quality of the fit curve and the signal-to-noise ratio of measurement signal 11. Individual extreme values which do not correspond to a further extreme value in another color channel are ignored below. Since the likelihood of the occurrence of an extreme value without corresponding color transition is very small, this is an effective means of eliminating noise-related distortions. In FIG. 2c for example the mistakenly detected extreme value 14 can be eliminated.

Figure 3A:
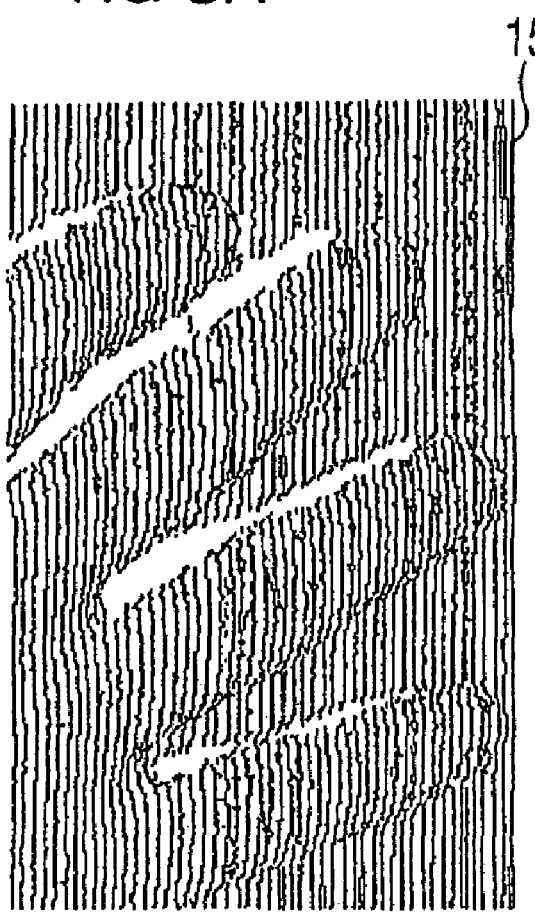
FIGS. 3a and b Illustrations of the reconstructed profile lines of a recorded object.
Figure 3B:
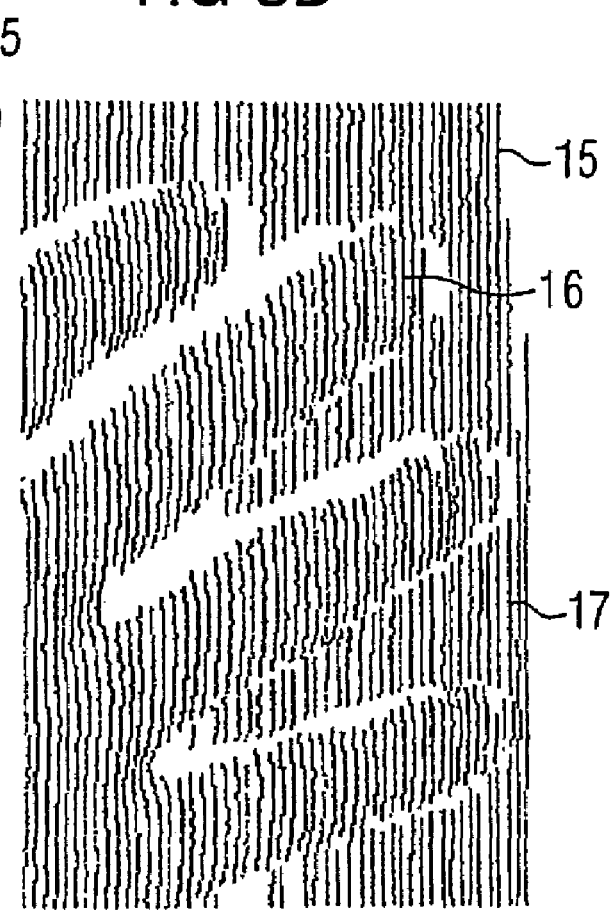

In a further procedural step identical extreme values will be combined into profile lines 15. FIG. 3a shows the result for the case in which the extreme values are not subject to any further filtering. Since however the color changes are structured with the aid of overlapping codewords which have a non-trivial Hamming distance between them, those extreme values which are based on color edges in the coloration of surface 2 can also be filtered out. The result is shown in FIG. 3b. The method described here is thus very much in a position to record the actual profile lines 15 of the color changes which are based on color changes in the color pattern 5.

In the subsequent execution sequence the projector levels g can be assigned via color coding to the points P of the image 7. The three-dimensional object data of the surface is then obtained by a triangulation, when the arrangement of the camera 6 and of the projector 4 are known.

The method described here can also be used to determine the coloring of the object to be recorded 3. The color value of a point P in the image 7 can be described by the following formula:

$$R_c = r_c \cdot \int_{\Delta\lambda} s_c(\lambda) \cdot I_p(\lambda) d\lambda + r_c \cdot \int_{\Delta\lambda} s_c(\lambda) \cdot I_A(\lambda) d\lambda$$

where $s_c(\lambda)$ gives the spectral sensitivity of a sensor element in the camera 6, $r_c(\lambda)$ is the spectral reflectivity of the associated surfaces 2, $I_p(\lambda)$ the spectral intensity of the radiation emitted by the projector 4 and $I_a(\lambda)$ the intensity of the background illumination. Since $I_p(\lambda)$ is known for each point P after the execution of the method described above, assuming that $R_c(\lambda)$ is essentially equal to a constant $r_c$, it is possible to calculate from the measured value $R_c$ in each color channel the constant $r_c$, when the effect of the background illumination can be ignored. The coloring of the surface 2 can then be obtained from the reflectivities $r_c$ of the three color channels. Taking account of adjacent values of $r_c$ it is finally possible to at least record the lower-frequency components of the coloring of the object 3.

The method has already been extensively tested. A color pattern, in which 104 stripes formed a unique encoding was used. For the projected color pattern 5 however a total of 156 light levels was used since the geometry of the test setup allows partial repetition of the coded pattern.

Both a simple slide projector and also an LCD projector were used for the projector 4. A simple slide projector for which the optics is optimized to a large depth of focus is the best alternative as regards cost.

Various RGB cameras with a resolution of 574×768 pixels were used for the camera. To suppress any possible crosstalk between the individual color channels good color separation in camera 6 is essential. A computer with a Pentium IV 2, 4 GHz processor was used for analysis unit 9. This allowed up to 15 images per second to be recorded and analyzed without optimizing the speed of the program code. The method is thus entirely suitable for recognition of gestures.

The method operates reliably if the variation of the coloring of surface 2 and the background illumination do not correspond in frequency and amplitude to the color change of the color pattern 5. This can also be seen from FIGS. 3a and 3b, in which the fingers 16 are resting on a multicolored support 17.

A surface must be at least 8×8 pixels in size in the image 7 to enable a three-dimensional coordinate to be assigned to it. Then at least two complete colored stripes are needed for analysis, with one colored stripe in camera 6 being at least 3 pixels wide;

Since an individual recording of the surface 2 is sufficient for the execution of the method described here in order to determine three-dimensional coordinates of the surface 2, the method and the device described here are particularly suitable for recording moving objects or objects which change their shape. The method described here is thus especially suited within the context of biometrics to facial recognition and to recording gestures. To this extent the method described here is primarily suited to identification and authentication of people.

Further areas of application relate to quality assurance of products, calibration of objects in the construction, for example for retrofitting, for repairs or for the expansion of existing machines or plant, or the three-dimensional modeling of objects in the multimedia and games area.

It should be pointed out that other color models, e.g. the YUV model, can be used for the description of the color pattern 5.

It should also be pointed out that the term camera can be taken to mean any imaging system.

The invention claimed is:

1. A method for three-dimensional detection of objects (3), comprising:
    projecting a color pattern (5) with known projection data onto the object to be detected (3);
    recording the color pattern (5) projected onto the object (3) with a camera (6); and
    processing the image (7) recorded by the camera (6) in an analysis unit (9) into three-dimensional object coordinates of the object (3),
    wherein
    the projection data in the color pattern (5) is encoded with the aid of redundant code, and color changes of the color pattern (5) are structured with the aid of codewords of redundant code and in which, during analysis in the analysis unit (9), the codewords are allowed corresponding color changes as valid color changes.

2. The method in accordance with claim 1, wherein color values in the color pattern (5) are structured with the aid of codewords of redundant code and in which the projection data of a point (P) of the image (7) are identified with the aid of a search performed by the analysis unit (9) for the codewords encoding the color values.

3. The method in accordance with claim 2, wherein codewords with a non-trivial Hamming distance are used.

4. The method in accordance with claim 2, in which the codewords are arranged so that they overlap.

5. The method in accordance with claim 2, wherein color changes of the color pattern (5) are structured with the aid of codewords of a redundant code and in which, during analysis in the analysis unit (9), the codewords are allowed corresponding color changes as valid color changes.

6. The method in accordance with claim 3, wherein the codewords are arranged so that they overlap.

7. The method in accordance with claim 1, wherein the color values are varied in each color channel between two values.

8. The method in accordance with claim 7, wherein the color values are varied in each color channel between a minimum value and a maximum value.

9. The method in accordance with claim 1, wherein the color values are changed in at least two channels together and in which color changes occurring in at least two color channels are allowed as valid color changes during analysis in the analysis unit (9).

10. The method in accordance with claim 1, wherein in each color channel within each codeword at least one color change is performed.

11. The method in accordance with claim 1, wherein in the analysis unit (9) the position of color changes in each color channel is determined with the aid of extreme values of a first derivation (12) of a measurement signal (11).

12. The method in accordance with claim 1, wherein the color pattern (5) is formed as stripes and in which, during analysis in the analysis unit (9), color changes corresponding to each other are combined into profile lines (15).

13. The method in accordance with claim 1, wherein an individual recording of the image (7) for determining the three-dimensional coordinates of the surface (2) of the object (3) is performed.

14. The method in accordance with claim 1, wherein by evaluating the color of the color pattern (5) recorded in the image (7) and the color originally projected in the color pattern (5) a coloring of the surface (2) of the object (3) is reconstructed.

15. A device for three-dimensional detection of objects with a projector (4) to project a color pattern (5) onto a surface (2) of an object to be recorded (3) and with a camera (6) to record an image (7) of the color pattern (5) projected onto the surface (2), as well as with an analysis unit (9) for analyzing the image (7), wherein the color pattern (5) that can be projected by the projector (4) and the analysis unit (9) are set up to execute the method in accordance with claim 1.

16. A method in accordance with claim 1 for recognizing faces of people.

17. A method in accordance with claim 1 for recognizing gestures of people.

18. The method in accordance with claim 1, wherein codewords with a non-trivial Hamming distance are used.

19. The method in accordance with claim 1, wherein the codewords are arranged so that they overlap.

* * * * *